(12) United States Patent
Chenausky et al.

(10) Patent No.: US 7,756,186 B2
(45) Date of Patent: Jul. 13, 2010

(54) UNSTABLE RESONATOR WITH VARIABLE OUTPUT COUPLING

(75) Inventors: Peter P. Chenausky, Avon, CT (US);
Lanny Laughman, Bolton, CT (US);
Eric R. Mueller, West Suffield, CT (US); Leon A. Newman, Glastonbury, CT (US); Vernon A. Seguin, Windsor, CT (US); Christian J. Shackleton, Granby, CT (US)

(73) Assignee: Coherent, Inc., Santa Clara, CA (US)

( * ) Notice: Subject to any disclaimer, the term of this patent is extended or adjusted under 35 U.S.C. 154(b) by 214 days.

(21) Appl. No.: 12/033,619

(22) Filed: Feb. 19, 2008

(65) Prior Publication Data
US 2008/0205475 A1    Aug. 28, 2008

Related U.S. Application Data

(60) Provisional application No. 60/902,975, filed on Feb. 23, 2007.

(51) Int. Cl.
*H01S 3/08* (2006.01)
(52) U.S. Cl. .............................. 372/95; 372/92; 372/99; 372/107
(58) Field of Classification Search ..................... None
See application file for complete search history.

(56) References Cited

U.S. PATENT DOCUMENTS

| | | | |
|---|---|---|---|
| 3,969,685 A | 7/1976 | Chenausky et al. | 331/94.5 C |
| 4,123,150 A | 10/1978 | Sziklas | 350/294 |
| 4,719,639 A | 1/1988 | Tulip | 372/66 |
| 4,939,738 A | 7/1990 | Opower | 372/95 |
| 5,048,048 A | 9/1991 | Nishimae et al. | 372/95 |
| 5,123,028 A | 6/1992 | Hobart et al. | 372/95 |

(Continued)

FOREIGN PATENT DOCUMENTS

EP    0 448 319 A2    3/1991

(Continued)

OTHER PUBLICATIONS

A.E. Siegman et al., Modes in Unstable Optical Resonators and Lens Waveguides, *IEEE Journal of Quantum Electronics*, vol. QE-3, No. 4, Apr. 1967, pp. 156-163.

(Continued)

*Primary Examiner*—Minsun Harvey
*Assistant Examiner*—Sean Hagan
(74) *Attorney, Agent, or Firm*—Morrison & Foerster LLP (57) ABSTRACT

Through the use of a relatively inexpensive third mirror on a novel folded hybrid unstable resonator configuration, the optimum output coupling for a given laser design can be explored quickly and easily with a minimum of intracavity mirror alignment. No changes in either the radii of curvature of the three cavity optics or their spacing are required for this exploration. In addition to providing techniques for purposefully and systematically introducing mirror edge effects or avoiding edges effects altogether, the invention provides that output beams of different width can be advantageously explored in a relatively simple and straightforward manner. The invention provides that higher geometric magnification cavity designs may be made compatible with low diffraction output coupling in a configuration that uses only three totally reflecting optics.

46 Claims, 3 Drawing Sheets

U.S. PATENT DOCUMENTS

| | | | | |
|---|---|---|---|---|
| 5,353,297 | A | 10/1994 | Koop et al. | 372/64 |
| 5,392,309 | A | 2/1995 | Nishimae et al. | 372/95 |
| 5,648,980 | A * | 7/1997 | Seguin | 372/92 |
| 6,134,256 | A | 10/2000 | Chenausky | 372/61 |
| 6,144,687 | A | 11/2000 | Jackson | 372/99 |
| 6,442,186 | B1 * | 8/2002 | Vitruk | 372/95 |
| 2003/0214993 | A1 * | 11/2003 | Baker | 372/92 |

FOREIGN PATENT DOCUMENTS

| | | |
|---|---|---|
| EP | 0 448 319 A3 | 3/1991 |
| JP | 5-226736 | 3/1993 |
| JP | 2002-16304 | 1/2002 |
| WO | WO 2004/100328 A1 | 11/2004 |

OTHER PUBLICATIONS

W.F. Krupke et al., "Properties of an Unstable Confocal Resonator $CO_2$ Laser System," *IEEE Journal of Quantum Electronics*, vol. QE-5, No. 12, Dec. 1969, pp. 575-586.

R.J. Freiberg et al., "An Experimental Study of Unstable Confocal $CO_2$ Resonators," *IEEE Journal of Quantum Electronics*, vol. QE-8, No. 12, Dec. 1972, pp. 882-892.

A. Gabai et al., "Radio-Frequency Excited Stripline CO and $CO_2$ Lasers," *CLEO Conference*, TuB4 Jun. 19, 1984, one page in length.

P.E. Jackson et al., "$CO_2$ large-area discharge laser using an unstable-waveguide hybrid resonator," *Appl. Phys. Lett.*, vol. 54, No. 20, May 15, 1989, pp. 1950-1952.

J. Handke et al., "Chemical oxygen-iodine laser power generation with an off-axis hybrid resonator," *Applied Optics*, vol. 45, No. 16, Jun. 1, 2006, pp. 3831-3837.

Yu.A. Anan'ev et al., "Influence of the Edge Effects on the Properties of Unstable Resonators," *Soviet Journal of Quantum Electronics*, vol. 1, No. 3, Nov.-Dec. 1971, pp. 263-267.

N. Hodgson et al., "Unstable Resonators with Excited Converging Wave," *IEEE Journal of Quantum Electronics*, vol. 26, No. 4, Apr. 1990, pp. 731-738.

*The Physics and Technology of Laser Resonators*, by D.R. Hall and P.E. Jackson, Chapter 2 entitled "Unstable Resonators," Section 2.5 entitled "Practical Resonators," 1st printed 1989 (ISBN 0-85274-117-0), pp. 26-27.

* cited by examiner

UNSTABLE RESONATOR WITH VARIABLE OUTPUT COUPLING

PRIORITY CLAIM

This application claims priority from U.S. Provisional Application No. 60/902,975, filed Feb. 23, 2007, and titled "Unstable Resonator with Variable Output Cooling." Provisional Application No. 60/902,975 is hereby incorporated by reference herein in its entirety.

FIELD OF THE INVENTION

The present invention relates generally to carbon dioxide ($CO_2$) slab lasers and, in particular, to a folded hybrid unstable resonator configuration for a $CO_2$ slab laser that facilitates quick and easy exploration of the optimum coupling for a given laser design with a minimum of intra-cavity mirror alignment.

BACKGROUND OF THE INVENTION

The worldwide market for high power, sealed-off, $CO_2$ lasers continues to expand because of the growing need for improvements in applications like hole drilling, marking, cutting and scribing in ceramic and other common industrial materials. Driving this market is the need for lower cost, compact lasers with output powers in the range of 500-1000 watts.

Over the past twenty years, hybrid unstable resonator technology has been shown to provide a systematic approach for enhancing the output power and improving the output mode quality of a particular class of large mode volume gas and solid state gain media lasers. This resonator technology can be generally described as having waveguide (or freespace gaussian) propagation in one transverse cavity dimension and unstable resonator propagation in a second transverse cavity dimension. Consequently, this technological approach, as exemplified in part by U.S. Pat. No. 4,719,639 (Ref. 1), U.S. Pat. No. 5,123,028 (Ref. 2) and U.S. Pat. No. 5,048,048 (Ref. 3), is ideally suited to laser gain media with a transverse cross section with a longer and a shorter side, the cross section being transverse to a cavity longitudinal axis. Such laser devices are variously described and known to those skilled in the art of high power lasers as slab or slice $CO_2$ lasers or slab YAG lasers.

As applied to $CO_2$ lasers, hybrid unstable resonator technology continues to exploit the early attributes of unstable resonators initially stated four decades ago in Ref 4. Namely, (1) unstable resonators can have large mode volumes even in very short resonators, (2) the unstable configuration is readily adapted to adjustable diffraction output coupling, and (3) the analysis indicates that unstable resonators should have very substantial discrimination against higher-order transverse modes. Thus, for example, lasers made according the teachings in the above-cited '028 patent achieve sealed-off $CO_2$ output powers of over 500 W in package sizes of about 1 meter long.

However, for all of the advantages enjoyed by the technology disclosed in the above-cited '639, '048 and '028 patents, including utilization of only two all-reflecting cavity optics and the extraction of a filled in output beam, this technology can only achieve a practical variable output coupling by changing a minimum of both cavity mirror radii and the width of the mirror at the output coupling end of the resonator.

Figure 1:
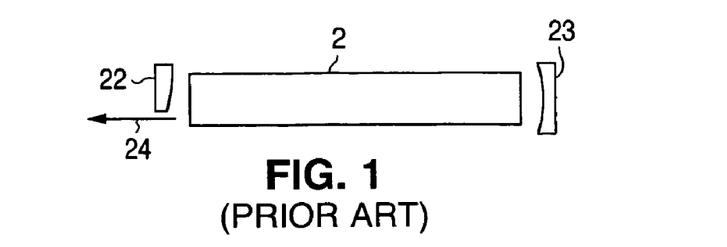
FIG. 1 illustrates a resonator structure disclosed in U.S. Pat. No. 4,719,639.
Figure 2:
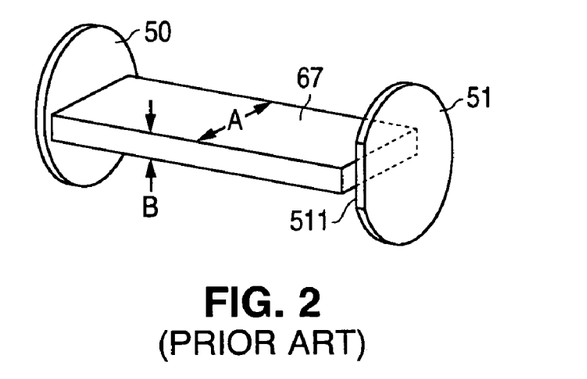
FIG. 2 illustrates a resonator structure disclosed in U.S. Pat. No. 5,048,048.

FIGS. 1 and 2 illustrate the salient features of the '639 patent technology and the '048 patent technology, respectively. FIG. 1 shows a plan view of a resonator structure that includes a conductive electrode 2 and pair of aligned reflectors 22 and 23 disposed at opposite ends of the electrode 2. Arrow 24 represents the output beam of the resonator structure. FIG. 2 shows a perspective view of a resonator structure wherein numeral 50 designates a totally reflecting concave mirror, numeral 51 designates a totally reflecting output mirror, and numeral 67 designates a discharge space corresponding to the discharge gap (height=A, width=B) between the spaced apart electrodes of the resonator structure. Numeral 511 designates a laser beam take-out means.

Because the two intra-cavity optics in a prior art high power output RF excited $CO_2$ hybrid unstable resonator system require water cooling, they are very expensive. As a consequence, this means that the determination of the optimum output coupling for a given length and width of active medium involves performing a series of detailed and careful experiments and requires utilization of an expensive and extensive set of cavity optics. Clearly, as each new set of cavity optics for each magnification data point is placed in the resonator, the cavity has to be realigned to a precision that precludes either overcoupling or undercoupling the active medium due to the resonator being inadvertently misaligned.

Figure 3:
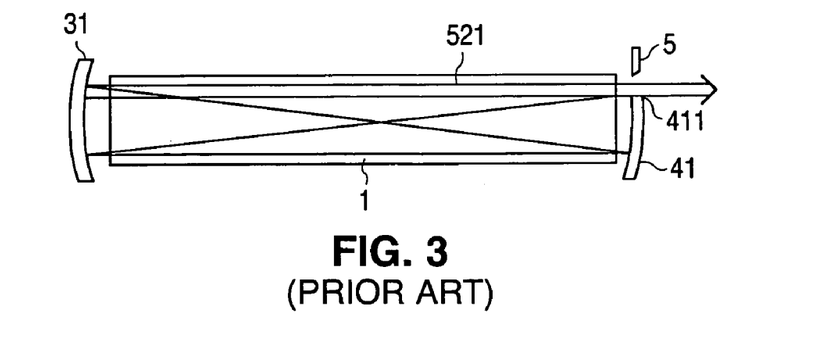
FIG. 3 illustrates a resonator structure disclosed in U.S. Pat. No. 5,392,309.

Another feature of prior art unstable resonators in general, and hybrid unstable resonators in particular, to which improvements have been directed is the quality of the diffraction coupled laser output beam. In this regard, U.S. Pat. No. 5,392,309 (Ref. 5) and associated FIG. 3 teach that clipping (or shading) of the outside edge of the rectangular beam that is typically extracted just past the shorter radius of curvature cavity end mirror is a means by which the shape and also the phase front of the diffracted output beam 521 can be improved. FIG. 3 is cross section view showing a resonator structure that includes a concave totally reflecting mirror 31 and a concave take-out mirror the upper end of which is notched to form a notch 411, Numeral 5 id FIG. 3 designates a shading plate that is disposed above the notch 411. Numeral 1 designates a laser active medium that is disposed between the total reflection mirror 31 and the take-out mirror 41.

It is well appreciated by those skilled in the art of unstable resonators that higher magnification cavity designs exhibit significantly higher diffraction output coupling losses for higher order transverse modes compared to lower order transverse modes. Thus, one way to promote laser oscillation in a transverse mode with desirable output characteristics would be to choose a cavity design of higher rather than lower geometric magnification. Unfortunately, higher geometric magnification and modest to short lengths of gain media are not normally compatible because this combination will result in overcoupling the gain medium of the laser.

Figure 4:
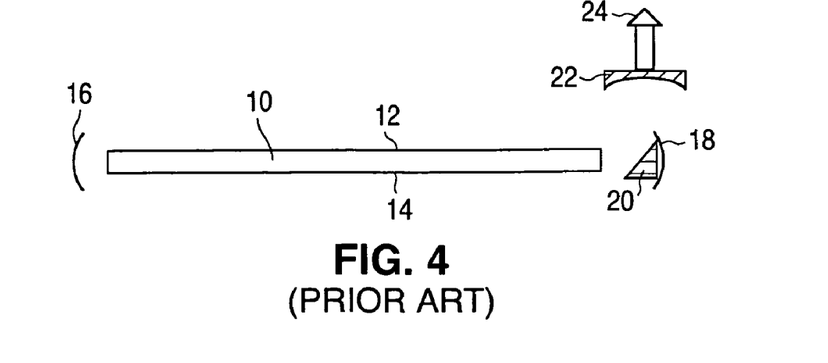
FIG. 4 illustrates a resonator structure disclosed in U.S. Pat. No. 6,144,687.

One approach to this dilemma is to use the teachings disclosed in U.S. Pat. No. 6,144,687 (Ref. 6), the essence of which is depicted in FIG. 4. FIG. 4 shows a resonator structure that includes a slab geometry lasing material 10 with a waveguide arrangement 12, 14 on either side thereof. Two totally reflecting mirrors 16, 18 are provided at respective ends of the waveguide and form an unstable sub-resonator. The rear mirror 16 extends over the full width of the waveguide cavity, while the front mirror 18 is of partial width, covering only one side of the resonator. Adjacent the front mirror 18 is a tuning mirror 20, at 45° to the axis of the resonator, which deflects light to exit the sub-resonator at right angles to its axis. The deflected beam then meets a partially reflective concave mirror that is external to the sub-resonator. The curvature of the external mirror 22 checks the divergence of the Intracavity resonator modes and returns light back into the waveguide. Some light 24 is coupled out of the resonator structure through the external mirror 22 and forms the output laser beam.

Early unstable resonator technology frequently employed symmetric transverse aperture gain media for $CO_2$ lasers (Ref. 7, 8) and, therefore, the laser output was extracted in an annular form and not as a filled-in beam. It is well known to those skilled in the art of unstable resonators that the main lobe of the far field radiation pattern of a near field annular beam may contain significantly less power than the Airy function resulting from a uniformly illuminated circular aperture. Thus, some early work (Ref. 9, 10) addressed the desirability of filling in the central region of the near field annular output beam to thereby improve the far field energy distribution of the extracted laser radiation. However, since the advent of the RF pumped slab $CO_2$ laser approach (Ref. 1, 2, 3, 5, 11, 12), which generates a large volume of gain medium between two closely spaced electrodes, the use of a one-sided hybrid unstable resonator avoids the complications associated with an annular shaped output beam because a preferred embodiment of hybrid unstable resonator laser systems yields a filled in output beam with a rectangular shape.

The appeal and utility of hybrid unstable resonator technology (Ref. 13, 14, 15, 16) is readily evident from the types of laser devices and shapes of optical media to which this technology has been applied. Furthermore, this technological approach as applied to asymmetric transverse aperture gain media clearly reflects the imprint of the early expectation (1) of above Ref. 4 with regard to large mode volumes in short resonator lengths. Likewise, with regard to expectation (3) above, it is well appreciated by those skilled in the art of unstable resonators that higher geometric magnification is associated with enhanced transverse mode discrimination. However, as a practical matter, the higher geometric magnification resonators must be rationalized with the typical case of low to moderate laser medium small signal gain. This rationalization process is especially critical in laser systems with short cavity lengths. To some extent, a higher geometric magnification hybrid unstable resonator can be made compatible with a laser system exhibiting low small signal gain by using four curved intracavity mirrors and longitudinally folding the hybrid unstable resonator (Ref. 17). In this case, taking advantage of a higher magnification resonator comes at the expense and complication associated with four curved intracavity optics. Another approach to exploring the benefits of higher geometric magnification (Ref. 6) in a hybrid unstable resonator system is to employ a combination of a totally reflecting tuning mirror and a partially transmitting mirror in a configuration that reflects a predetermined portion of the complete output beam wavefront back into the confocal region of the resonator. To realize the benefits of a higher geometric magnification in this case obviously requires the use of a very expensive, curved, partially transmitting optic and the need to use a high reflectivity intracavity beam deflection optic to direct the intracavity flux to the partial reflector.

On balance, however, for all of the advances in unstable resonator technology published and taught in the past twenty to forty years, the above expectation (2) of ref. 4 regarding the problem of easily achieving "adjustable diffraction output coupling" in hybrid unstable resonators has not been systematically addressed or solved.

SUMMARY OF THE INVENTION

In accordance with the concepts of the present invention, if one uses a relatively inexpensive third mirror in a new folded hybrid unstable resonator configuration, the optimum output coupling for a given laser design can be explored quickly and easily with a minimum of intracavity mirror alignment. No changes in either the radii of curvature of the three cavity optics or their spacing are required for this exploration. Furthermore, in addition to teaching a means of purposefully and systematically introducing mirror edge effects or avoiding electrode edge effects altogether, the present invention also provides that output beams of different width can be advantageously explored in a relatively simple and straightforward manner. Likewise, the invention provides that higher geometric magnification cavity designs may be made compatible with low diffraction output coupling in a configuration using only three totally reflecting optics.

These and other features and advantages of the present invention will be evident to those with skill in the art of unstable laser resonator systems generally and asymmetric cross section $CO_2$ laser devices specifically.

In light of the foregoing discussion, it is an object of the present invention to provide a means whereby the output coupling in a negative or positive branch hybrid unstable resonator laser system can be adjusted without changing the radius of curvature of any of the intracavity optics or changing the cavity length.

It is an object of the present invention whereby the magnitude of the diffractive output coupling in a hybrid unstable resonator system may be changed without changing the magnification of the unstable resonator.

It is also an object of the present invention whereby a given level of diffractive output coupling may be obtained with widely different resonator geometric magnification.

It is an object of the present invention whereby the adjustable coupling means can be applied to a laser gain medium shape transverse to a cavity longitudinal axis that has a longer and a shorter side.

It is an object of the present invention whereby the adjustable coupling means can be applied to both positive and negative branch standing wave hybrid unstable resonator laser systems employing only all reflecting optics.

It is also an object of the present invention to provide a means whereby the size of the output beam from a negative or positive branch hybrid unstable resonator laser system can be changed without changing the radii of curvature of the cavity optics or the cavity length.

It an object of the present invention to permit using the combination of very high geometric magnification and low diffraction output coupling in a negative or positive branch hybrid unstable resonator laser system that employs only all reflecting optics.

It is a further object of the present invention to provide enhanced overlap between the circulating mode and the asymmetric transverse gain medium in a positive or negative branch hybrid unstable resonator laser system.

It is a further object of the present invention to provide a means whereby intracavity circulating flux in a hybrid unstable resonator laser system that would normally be extracted at one end the longer side of the asymmetric transverse gain medium cross section is made to communicate with and to ultimately be extracted from a more central region of gain medium cross section.

It is a further object of the present invention to provide a means whereby edge diffraction effects can be generated by at least one interior intracavity mirror edge of the hybrid unstable resonator laser system without such edge diffraction means resulting in a reduction of the overall optimum laser output power.

It is a further object of the present invention to provide a means whereby edge diffraction effects can be provided by systematically tailoring one edge an inexpensive planar intracavity resonator mirror.

It is an object of the present invention to provide a pair of edges on either side of the extracted output beam in a hybrid unstable resonator to influence the buildup of the forward cavity mode in a standing wave unstable resonator.

It is an object of the present invention to provide at least two edges with which the extracted output beam in a hybrid unstable resonator can interact to influence the buildup of cavity modes in a standing wave unstable resonator.

It is a further object of the present invention to provide a means to systematically control the number of intracavity passes between the diverging mode in a standing wave hybrid unstable resonator laser system and the converging mode in said standing wave resonator system.

It is an object of the present invention to provide a means to systematically control the amount of coupling between the diverging mode and the converging mode in a hybrid unstable resonator laser system.

It is an object of the present invention to provide a simple means for implementing wavelength control in a hybrid unstable resonator laser system.

It is an object of the present invention to provide a simple means for implementing band control in a $CO_2$ hybrid unstable resonator laser system.

DETAILED DESCRIPTION OF THE INVENTION

Figure 5:
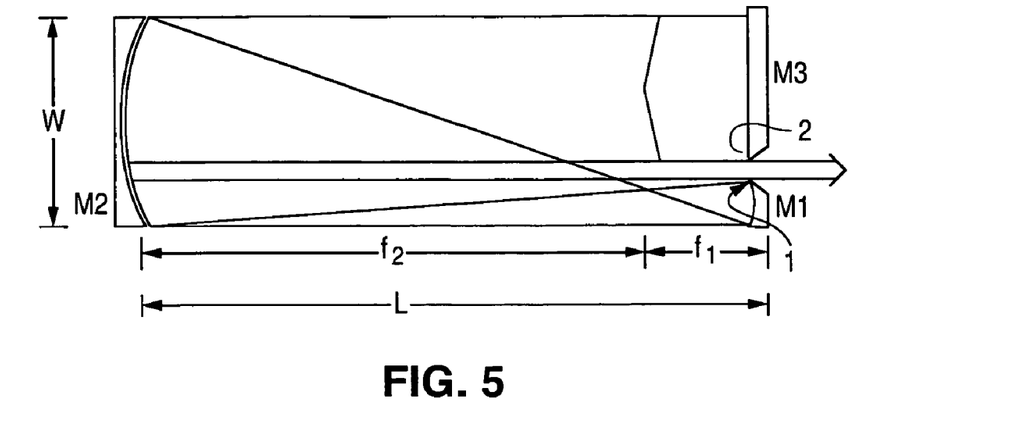
FIG. 5 illustrates a folded three mirror embodiment of a hybrid unstable resonator in accordance with the concepts of the present invention.

FIG. 5 shows a folded three mirror embodiment of a hybrid unstable resonator in accordance with the concepts of the present invention as viewed perpendicular to the longer transverse side of the gain medium cross section. The FIG. 5 depiction emphasizes a high geometric magnification, negative branch confocal pair communicating with a comparatively large aperture planar cavity end mirror. This configuration addresses a combination of high geometric magnification and modest to low fractional output coupling.

Also depicted in FIG. 5 are two features, designated by reference numerals 1 and 2, positioned at the upper edge of mirror M1 and the lower edge of mirror M3, respectively. Feature 1 on mirror M1 is a contoured edge nominally taught as part of prior art technology as the element responsible for radiation reflected from the forward or expanding wave of a hybrid unstable resonator that acts as the source of radiation initially feeding the reverse wave of such cavities. In accordance with the invention, feature 2 on mirror M3 augments the scattering function of feature 1 by providing a source of scattered radiation that is symmetrically located with respect to feature 1 on the opposite side of the diffraction coupled laser output beam. Such augmentation may, for example, include employing a curve or scattering edge different than that used on mirror M1. Also, because mirror M3 is envisioned as a relatively inexpensive totally reflecting optical element, a variety of edge shapes can be investigated to determine the optimum edge or surface treatment on mirror M3 for a desired modal output. Moreover, in the high magnification, low diffraction output coupling regime as shown in FIG. 5, the surface of mirror M3 might advantageously employ a hole grating arrangement or employ Fresnel reflecting features to enhance laser operation on a single $CO_2$ transition or otherwise assist in restricting the laser output to a single $CO_2$ band.

Figure 6:
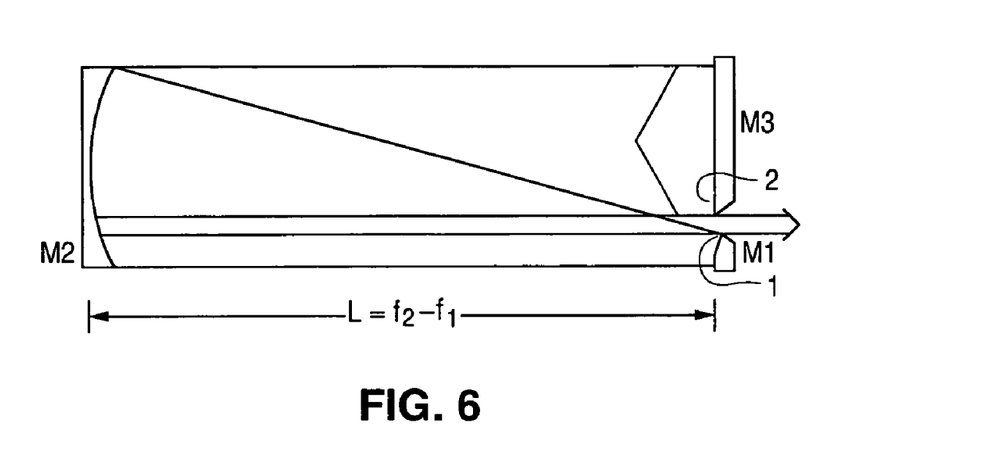
FIG. 6 illustrates a positive branch version of the FIG. 5 embodiment of the invention.

FIG. 6 shows a positive branch version of FIG. 5. In this arrangement, the reflecting surface of mirror M1 is convex while the reflecting surface of mirror M2 is concave so that the confocal condition for a cavity of length L is given by $L=f2-f1$ and where the common focal plane for the confocal M1/M2 mirror pair is located to the right of mirror M2. Like the arrangement in FIG. 5, mirror M3 has a lower scattering feature 2 that is symmetrically located opposite scattering feature 1 on mirror M1.

Figure 7:
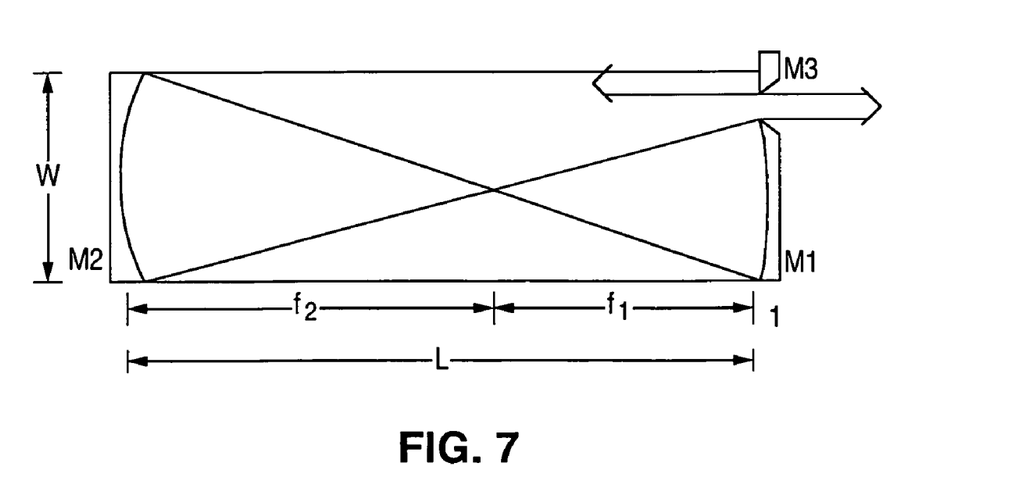
FIG. 7 illustrates a folded three mirror embodiment of a hybrid unstable resonator in accordance with the invention as viewed perpendicular to the longer transverse side of the gain medium cross section.

FIG. 7 shows a folded three mirror embodiment of the disclosed hybrid unstable resonator concept as viewed perpendicular to the longer transverse side of the gain medium cross section. The FIG. 7 depiction emphasizes a moderate geometric magnification, negative branch confocal pair communicating with a comparatively small aperture planar cavity end mirror. This configuration addresses a resonator design whereby the aperture of the third cavity mirror is set to reduce the aperture of the magnified forward standing wave mode by about 50%.

Figure 8:
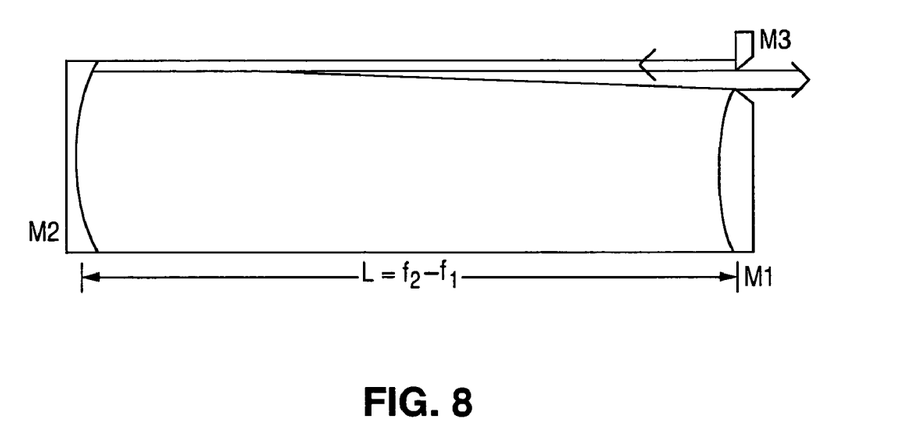
FIG. 8 illustrates a folded three mirror embodiment of a hybrid unstable resonator in accordance with the invention as viewed perpendicular to the longer transverse side of the gain medium cross section.

FIG. 8 shows a folded three mirror embodiment of the disclosed hybrid unstable resonator concept as viewed perpendicular to the longer transverse side of the gain medium cross section. The FIG. 8 depiction emphasizes a moderate to low geometric magnification, positive branch confocal pair communicating with a comparatively small aperture cavity end mirror. This configuration addresses a resonator design whereby the aperture size and the front surface of the third cavity mirror could be specified to force oscillation on a single line or encourage lasing on a single band of the $CO_2$ molecule.

Figure 9:
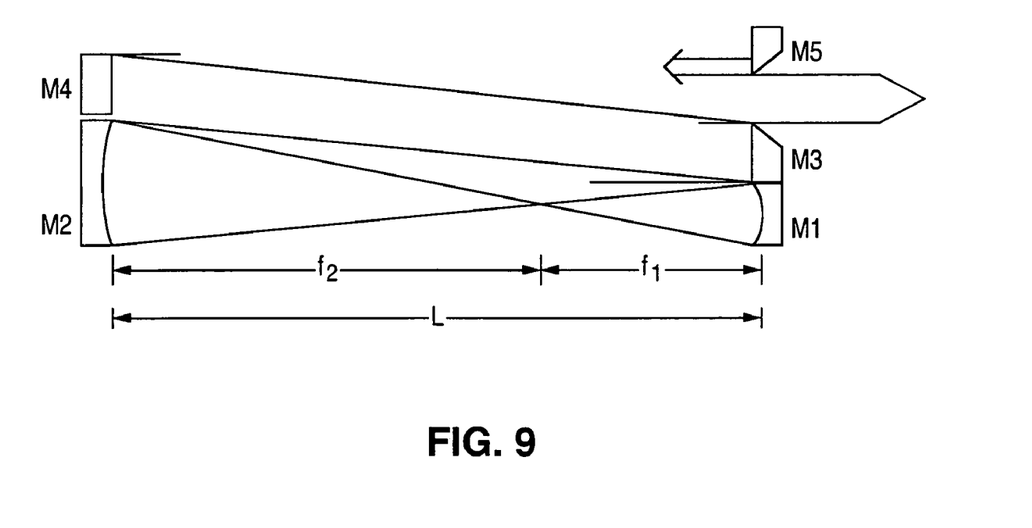
FIG. 9 illustrates a folded five mirror embodiment of a hybrid unstable resonator in accordance with the concepts of the present invention as viewed perpendicular to the longer transverse side of the gain medium cross section.

FIG. 9 shows a folded five mirror embodiment of the disclosed hybrid unstable resonator concept as viewed perpendicular to the longer transverse side of the gain medium cross section. This depiction shows a moderate geometric magnification, negative branch confocal pair communicating with three additional planar cavity end mirrors. This configuration addresses a resonator design whereby the aperture of the third and fourth cavity mirrors are set to relay the full width of the intracavity radiation leaving the confocal pair but where the fifth cavity mirror set to allow a less than the full beamwidth of the intracavity flux to exit the five mirror cavity and where the remaining collimated piece is returned to repass the gain medium and eventually communicate with the confocal pair.

This embodiment addresses the issue of achieving a cavity free spectral range corresponding to a cavity length as long as three times the confocal mirror spacing.

Referring back to FIG. 5, a high magnification negative branch hybrid unstable resonator is shown as viewed perpendicular to the longer side of an asymmetric transverse cross section gain medium. Asymmetric laser gain media such as this are well known to practitioners of unstable resonator art and are taught and described in Ref. 1, 2, 6, 11, 12, 13, 14, 15, 16 and 17 among others. The shorter side of such an asymmetric transverse cross section would be arranged to support a waveguide or freespace mode of operation. The gain media might be slab or slice $CO_2$ RF or dc excited media, dye laser media, COIL media or slab solid state laser media. For a slab $CO_2$ gain region, the discharge electric field would be directed parallel to the shorter side of the transverse cross section, while for a slice $CO_2$ gain region, the discharge electric field would be oriented perpendicular to the shorter side of the transverse cross section.

In the view depicted in FIG. 5, the asymmetric transverse cross section is normal to the longitudinal cavity axis formed by connecting mirrors M1, M2 and M3. In this embodiment, the confocal mirror pair M1/M2 is shown to communicate with mirror M3 to form a U shaped or vee shaped cavity. The illustrated M1/M2 mirror combination is intended to represent a geometric magnification of magnitude about m=5, but where the size of mirror M3 is set to allow only about 10% diffractive output coupling from the M1, M2, M3 cavity. The confocal requirement for the cavity in FIG. 5 is L=f1+f2, where L is the spacing between mirror M1 and mirror M2 and f1 is the focal length of mirror M1 and f2 is the focal length of mirror M2. For a geometric magnification m=f2/f1=5 and L=1 meter, the confocal requirement is satisfied when f1=⅙ m concave and f2=⅚ m concave. A conventional confocal hybrid unstable resonator with a geometric magnification of 5 would normally have an output coupling of c=1−1/m or a coupling of 80%. Thus, this embodiment illustrates that high geometric magnification and low diffractive output coupling are now compatible. To increase the output coupling, one only has to translate mirror M3 parallel to the longer side of the asymmetric cross section gain medium so that the distance between mirrors M1 and M3 is increased. To the extent that this translation can be accomplished while maintaining the front surface of mirror M3 normal to the cavity longitudinal axis, then it is obvious that the output coupling can be adjusted without changing the spacing between mirrors M1 and M2, their focal lengths or altering the alignment of mirrors M1, M2 or M3 or any combination thereof.

It is well known to those with skill in the art of hybrid unstable resonators that the essential optical feedback necessary for intracavity mode regeneration in a prior art unstable resonator is generated by the single edge feature, designated feature 1 (Ref. 18) in the lower right hand corner of FIG. 5. For low geometric magnification resonators taught by the prior art, this single edge would be located near the upper edge of the intracavity mode and the gain medium of FIG. 5. Therefore, the embodiment of the invention illustrated in FIG. 5 effectively doubles the source of this essential feedback by providing two scattering edges rather than one edge as is common in prior art hybrid unstable resonators. Furthermore, to the extent that tailoring the edges of the feedback (or output coupling) mirror in unstable resonators is known to provide a means to tailor the intensity distribution of the circulating intracavity mode, it is clear that this level of incidental feedback is dwarfed by the level of intracavity flux returning to the M1/M2 confocal mirror pair from the front surface of mirror M3.

As will be appreciated by those skilled in the art, with regard to FIG. 5 and similarly to all of the figures of the disclosed embodiments of the invention, when intra-cavity light reflected from mirror M3 returns to the M1/M2 mirror combination, the radiation is successively de-magnified (Ref. 19, 20) on each cavity round trip. On the first round trip traversal in this reverse direction, the width of the intracavity mode is reduced by a factor of 1/m. This reduction in aperture is just enough to not allow the intracavity flux to intercept mirror M3. On each successive round trip in the reverse cavity mode direction, the reflected flux from mirror M3 continues to be demagnified until diffraction effects dominate this process. At this point, the intracavity flux from mirror M3 can no longer be demagnified and starts to feed the forward or expanding mode of the standing wave cavity (Ref. 19, 20). Because the return radiation from mirror M3 alternates to either side of the M1/M2 optical centerline, the feedback of cavity flux into the reverse cavity standing wave mode by mirror M3 can serve to homogenize any deleterious or undesirable amplitude or phase feature inadvertently generated by the upper edge of mirror M1, the lower edge of mirror M2 or the front surface of mirror M3 itself.

In summary, mirror M3 in FIG. 5 serves to (1) provide one of two scattering edges, symmetrically located on each side of the diffraction coupled output beam, wherein the edges generate feedback for the reverse standing wave cavity mode, (2) provide a high level of cavity flux to feed the reverse standing wave cavity mode, (3) provide a systematic coupling between the commonly recognized forward or expanding mode in a standing wave unstable resonator to the less commonly recognized converging wave mode in such a resonator, (4) provide a means where the free spectral range of the cavity can be decreased, (5) provide a means to enjoy the benefits of high geometric magnification and low diffractive output coupling, (6) provide a means whereby the size of the output beam can be varied, and (7) provide a means whereby the magnitude of the output coupling can be varied from a very low value to the maximum value determined by the ratio of f2/f1 without changing the value of f1, f2, the spacing between f1 and f2 or the alignment of mirrors M1, M2 or M3.

As stated above, FIG. 6 shows the positive branch confocal hybrid unstable resonator counterpart to that illustrated in FIG. 5. The confocal condition for this configuration is f2−f1=L, where L is the spacing between mirror M2 and mirror M1 and f2 and f1 are the respective focal lengths of the confocal mirror pair M2/M1. Mirror M3 is depicted in this embodiment as a planar optic spaced a distance L from mirror M2. For a geometric magnification m=5 and a M2M1 spacing of L=1 m, the confocal requirement is satisfied when f2=1.25 m concave and f1=0.25 m convex. Like its negative branch counterpart, mirror M3 in FIG. 6 is aligned to return all of a predetermined portion of the cavity flux reflecting from mirror M2 directly to the confocal mirror pair M2/M1. On this basis, mirror M3 operates in completely different manner than element 22 of FIG. 4 ('687 patent) since the teaching of the '687 patent is for element 22 to return a predetermined amount of all of the radiation incident on its front surface. The predetermined portion of cavity flux returned by mirror M2 to the confocal pair in the instant invention is set by the size of mirror M3 as measured along the longer side of gain medium transverse cross section. In the embodiment depicted in FIG. 6, the predetermined portion of cavity flux reflected by the total reflecting front surface of mirror M3 is such as to allow a diffractive output coupling of about 10%. As with FIG. 5, feature 1 of cavity optic mirror M1 serves to provide the essential feedback necessary to regenerate the forward or expanding wave mode of the mirror M1/M2 portion of a prior art hybrid unstable resonator. This essential prior art feedback is augmented by feature 2 on mirror M3 and by the reflected radiation from the front surface of mirror M3. Clearly, for a high geometric magnification, the magnitude of direct reflection from mirror M3 dwarfs the scattering generated by features 1 and 2 on mirrors M1 and M3. Based on the description of the embodiment of the invention shown in FIG. 5, it should be clear to those skilled in the art of hybrid unstable resonators that both the size of the diffracted output beam in FIG. 6 and the level of diffraction coupling from the three mirror cavity can be varied without changing the alignment or curvatures of mirrors M1, M2 or M3 or the spacing between any of the three cavity optic as long as mirror M3 is translated in one dimension such that the front surface of mirror M3 is maintained so as to exactly reflect the flux coming from mirror M2 toward mirror M3 back towards mirror M2.

The embodiment of the invention shown in FIG. 7 depicts a confocal negative branch hybrid unstable resonator according to the teachings herein with a geometric magnification of about m=1.25 and thus would have a geometric output coupling of c=1−1/m=20%. For a confocal pair separation of length L=1 m, the confocal condition thus requires that f1=0.444 m concave and f2=0.555 m concave. In the embodiment of FIG. 7, the size of mirror M3 is arranged to permit a diffractive output coupling of about 10%, which is about half the geometric output coupling of a prior art m=1.25 hybrid branch unstable resonator. It is notable that the m=5 design of FIG. 5 and the m=1.25 design of FIG. 7 utilize curvatures for mirrors M1 and M2 that are not all that different even though the diffraction output coupling for each embodiment can be adjusted according to the teachings herein to be about 10% in both cases if so desired. If the longer transverse dimension of the gain space cross section in FIGS. 5 through 7 is denoted W, then it can be seen by comparing FIGS. 5 and 7, that the location of the output beam can be made to fall at a position of W/2 by judiciously choosing the size of mirror M3 and the geometric magnification of the confocal mirror pair M1/M2 according to the teachings of the present invention. Furthermore, in view of FIG. 6, this degree of freedom is available to designs of either negative or positive branch.

As stated above, FIG. 8 shows another embodiment of a confocal positive branch hybrid unstable resonator made according to the teachings of the present invention with mirror M3 sized to yield a diffractive output coupling in the range of 10%. For a depicted geometric magnification of about m=1.25 and a spacing between mirror M1 and mirror M2 of 1 m, a focal length of f2=5 m concave and f1=4 m convex is necessary to satisfy the confocal requirement. For a prior art hybrid unstable resonator, this would yield a diffractive output coupling of 20%.

FIG. 9 shows a negative branch confocal mirror pair M1/M2 employed in conjunction three additional cavity extending optics mirrors M3, M4 and M5. In this depiction, f2/f1=2 and L, which is the distance between cavity optics mirrors M1 and M2 is made such that L=f2+f1. If L is 1 m, then the confocal requirement is satisfied when f1=⅓ m and f2=⅔ m. In the FIG. 9 embodiment, mirrors M3 and M4 serve to lengthen the cavity by essentially two additional cavity confocal lengths before the intracavity flux encounters the output mirror M5. In this way, the FIG. 9 embodiment is configured to provide a means to achieve a lower overall cavity free spectral range than could be obtained with a conventional prior art hybrid unstable resonator whose cavity length was only L=f1+f2.

To those who are skilled in the art of diffusion cooled, RF pumped slab or slice $CO_2$ lasers or diode or flashlamp pumped solid state lasers it should be realized that the preferred embodiments herein described are by way of illustration and not limitation. Therefore various modifications may be made without departing from the spirit and scope of disclosed invention.

1) Ref. 1, U.S. Pat. No. 4,719,639, "Carbon Dioxide Slab Laser", by John Tulip, filed 8 Jan. 1987.
2) Ref. 2, U.S. Pat. No. 5,048,048, "Gas Laser Device", by J. Nishimae, K. Yoshizawa, M. Take, filed 9 Aug. 1990.
3) Ref. 3, U.S. Pat. No. 5,123,028, "RF Excited $CO_2$ Slab Laser", by J. L. Hobart, J. M. Yarborough, J. Dallarosa and P. Gardner, filed 12 Oct. 1990.
4) Ref. 4, A. E. Siegman and R. Arrathoon, "Modes in Unstable Optical Resonators and Lens Waveguides", IEEE J. Quantum Electronics, vol. QE-3, pp. 156-163, April 1967.
5) Ref. 5, U.S. Pat. No. 5,392,309, "Laser Apparatus Includes an Unstable Resonator and a Shading Means", by J. Nishimae, K. Yoshizawa and K. Kumamoto, filed 16 Sep. 1993.
6) Ref. 6, U.S. Pat. No. 6,144,687, "Laser", by P. E. Jackson, filed 4 Sep. 1998.
7) Ref. 7, W. F. Krupke and W. R. Sooy, "Properties of an Unstable Confocal Resonator $CO_2$ Laser System", IEEE J. Quantum Electronics, vol. QE-5, pp. 575-586 December 1969.
8) Ref. 8, R. J. Freiberg, P. P. Chenuasky and C. J. Buczek, "An Experimental Study of Unstable Confocal $CO_2$ Resonators", IEEE J. Quantum Electronics, vol. QE-8, pp. 882-892, December 1972.
9) Ref. 9, U.S. Pat. No. 3,969,685, "Enhanced Radiation Coupling from Unstable Laser Resonators", By P. P. Chenausky and R. J. Freiberg, filed 6 Dec. 1974.
10) Ref. 10, U.S. Pat. No. 4,123,150, "Stable Resonators for Radial Flow Lasers", by E. A. Sziklas, filed 21 Apr. 1977.
11) Ref. 11, A. Gabi, R. Hertzberg and S. Yatsiv, "Radiofrequency Excited Stripline CO and $CO_2$ Lasers", Paper TuKKy CLEOS Conference, 1980.
12) Ref. 12, P. E. Jackson, H. J. Baker and D. R. Hall, "$CO_2$ large-area discharge laser using an unstable-waveguide hybrid resonator", Appl. Phy. Lett. Vol. 54, No. 20, May 1989, pp. 1950-1952.
13) Ref. 13, International Patent Application Number PCT/RU2003000220, "Laser with Hybrid-Unstable Ring Resonator", V. E. Sherstobitov and A. Y. Rodionov, filed 7 May 2003.
14) Ref. 14, U.S. Pat. No. 4,939,738, "High-Power Waveguide Laser", by H. Opower, filed 30 Aug. 1989.
15) Ref. 15, U.S. Pat. No. 6,134,256, "Slice Laser", by P. P. Chenausky, filed 4 May 1998.
16) Ref. 16, J. Handke, W. O. Schall, T. Hall, F. Duschek and K. M. Grunewald, "Chemical oxygen-iodine laser power generation with an off-axis hybrid resonator", Appl. Opt., Vol. 45, No. 16, 1 Jun. 2006.
17) Ref. 17, U.S. Pat. No. 5,353,297, "Gas Slab Laser with Folded Resonator Structure", by D. E. Koop and H. Hecht, filed 12 Jul. 1993.
18) Ref. 18, Yu. A. Anan'ev and V. E. Sherstobitov, "Influence of the edge effect on the properties of unstable resonators", Sov. J. Quantum Electronics, Vol. 1, pp. 263-267, November 1971.
19) Ref. 19, N. Hodgson and H. Weber, "Unstable Resonators with Excited Converging Wave", IEEE J. Quantum Electronics, Vol. 26, No. 4, April 1990.
20) Ref. 20, D. R. Hall and P. E. Jackson, "*The Physics and Technology of Laser Resonators*", pp. 26, 27, ISBN 0-85274-117-0.

What is claimed is:

1. A laser comprising a laser gain medium, the laser gain medium being positioned within a standing wave unstable optical resonator supporting a forward and reverse standing wave resonator mode and a corresponding forward and reverse mode volume, the resonator having a longitudinal optical resonator axis, the longitudinal resonator axis connecting at least first, second and third resonator mirrors, the first and second resonator mirrors forming a beam expansion segment for the forward standing wave resonator mode and the third resonator mirror being located near but spaced from the second resonator mirror and disposed to reflect all of a predetermined fraction of the forward standing wave mode into the reverse standing wave mode volume, and wherein the remainder of the predetermined fraction of the forward standing wave resonator mode passing between the second and third resonator mirrors is diffractively outcoupled from the resonator and wherein said third mirror is planar permitting adjustment of the amount of light coupled out of the resonator by adjusting the position of the third mirror with respect to the second mirror thereby changing the spacing between the second and third mirrors.

2. The laser of claim 1, wherein the unstable resonator comprises a positive branch unstable resonator.

3. The laser of claim 1, wherein the unstable resonator comprises a negative branch unstable resonator.

4. The laser of claim 1, wherein the unstable resonator is a hybrid negative branch unstable resonator.

5. The laser of claim 1, wherein the laser gain medium has an elongated shape with a generally rectangular cross-section, the gain medium cross-section having an average longer and a shorter side, the gain medium cross-section being perpendicular to the longitudinal axis of the resonator, the optical resonator being guided wave in the shorter side of the gain medium cross-section.

6. The laser of claim 1, wherein the laser gain medium has an elongated shape with a generally rectangular cross-section, the gain medium cross-section having an average longer and a shorter side, the gain medium cross-section being perpendicular to the longitudinal axis of the resonator, the optical resonator being freespace stable in the shorter side of the gain medium cross-section.

7. The laser of claim 5, wherein the laser gain medium is a solid state medium.

8. The laser of claim 5, wherein the laser gain medium is a molecular gas excited by an RF discharge.

9. The laser of claim 8, wherein the laser gain medium is the gas $CO_2$.

10. A laser comprising a laser gain medium, the laser gain medium being positioned within a hybrid standing wave unstable optical resonator having a forward and reverse standing wave resonator mode volume, the resonator having a longitudinal optical resonator axis, the longitudinal resonator axis connecting at least first, second and third resonator mirrors, the first and second resonator mirrors forming the beam magnification segment for the forward standing wave resonator mode and the third resonator mirror being located near but spaced from the second resonator mirror and disposed to reflect all of a predetermined fraction of the forward standing wave mode incident on said at least third mirror into the reverse standing wave mode volume, and wherein the remainder of the predetermined fraction of the forward standing wave resonator mode passing between the second and third resonator mirrors is diffractively outcoupled from the resonator and wherein said third mirror is planar permitting adjustment of the amount of light coupled out of the resonator by adjusting the position of the third mirror with respect to the second mirror thereby changing the spacing between the second and third mirrors.

11. The laser of claim 10, wherein the hybrid standing wave unstable resonator is a positive branch resonator.

12. The laser of claim 10, wherein the hybrid standing wave unstable resonator is a negative branch resonator.

13. The laser of claim 12, wherein the beam expansion section is confocal.

14. The laser as recited in claim 12, wherein the laser gain medium has an elongated shape with a generally rectangular cross-section, the gain medium cross-section having an average longer and a shorter side, the gain medium cross-section being perpendicular to the longitudinal axis of the resonator, the optical resonator being guided wave in the shorter side of the gain medium cross-section.

15. The laser as recited in claim 12, wherein the laser gain medium has an elongated shape with a generally rectangular cross-section, the gain medium cross-section having an average longer and a shorter side, the gain medium cross-section being perpendicular to the longitudinal axis of the resonator, the optical resonator being freespace stable in the shorter side of the gain medium cross-section.

16. The laser of claim 15, wherein the laser gain medium is a molecular gas excited by an RF discharge.

17. The laser of claim 16, wherein the molecular gas is $CO_2$.

18. The laser of claim 14, wherein the gain medium is solid state.

19. The laser of claim 18, wherein the solid state medium is Nd:YAG.

20. A laser comprising an elongated laser gain medium, the elongated laser gain medium being positioned within a hybrid unstable optical resonator having at least first, second and third resonator mirrors, the first and second resonator mirrors forming a unstable confocal mirror group, the resonator having an exclusively collimated region with the third resonator mirror being located near but spaced from the second resonator mirror and disposed in the exclusively collimated region of the resonator and aligned to communicate with the confocal mirror group, the third resonator mirror returning all of a predetermined portion of the exclusively collimated region to the confocal mirror group and wherein the remainder of the predetermined fraction of the exclusively collimated region passing between the second and third resonator mirrors is diffractively outcoupled from the resonator and wherein said third mirror is planar permitting adjustment of the amount of light coupled out of the resonator by adjusting the position of the third mirror with respect to the second mirror thereby changing the spacing between the second and third mirrors.

21. The laser of claim 20, wherein confocal mirror group comprises a negative branch unstable resonator whose absolute value of geometric magnification is greater than unity.

22. The laser of claim 21, wherein the laser gain medium comprises an RF excited molecular gas.

23. The laser as recited in claim 22, wherein the molecular gas comprises $CO_2$.

24. A laser comprising a laser gain medium, the laser gain medium being located within an optical resonator and a diffractively coupled output aperture, the resonator having at least three mirrors and a longitudinal optical resonator axis, at least two of the resonator mirrors having adjacent edges, the gain medium having an elongated shape with a generally rectangular cross-section, the gain medium cross-section having an average longer and an average shorter side, the gain medium cross-section being perpendicular to the longitudinal optical axis of the resonator, the optical resonator being characterized as an unstable resonator in the longer side of the laser medium cross-section, the unstable resonator having a beam expansion segment and a collimated segment wherein the adjacent edges of the adjacent resonator mirrors define the diffractively coupled output aperture and wherein one of said adjacent resonator mirrors is planar permitting adjustment of the amount of light coupled out of the aperture by adjusting the position of the planar mirror with respect to the other adjacent mirror thereby changing the spacing between adjacent mirrors.

25. The laser of claim 24, wherein the gain medium comprises a solid state gain medium.

26. The laser of claim 25, wherein the solid state gain medium comprises Nd:YAG.

27. The laser of claim 24, wherein the gain medium is a molecular gas excited by an RF discharge.

28. The laser of claim 27, wherein the molecular gas comprises $CO_2$.

29. The laser of claim 24, wherein the optical resonator is guided wave in the shorter side of the gain medium cross section.

30. The laser of claim 24, wherein the optical resonator is freespace stable in the shorter side of the gain medium cross section.

31. The laser of claim 24, wherein the beam expansion segment is unstable and confocal.

32. The laser of claim 31, wherein the beam expansion segment is positive branch unstable.

33. The laser of claim 31, wherein the beam expansion segment is negative branch unstable.

34. A laser comprising an elongated laser gain medium, the laser gain medium being positioned within a hybrid unstable optical resonator with a longitudinal resonator axis and a diffractively coupled output aperture, the resonator having at least first, second and third resonator mirrors, the first and the second resonator mirrors forming an unstable and substantially confocal mirror group, the second and third resonator mirrors being disposed at the same end of the elongated gain medium, the second and third mirrors having two adjacent edges, the two said edges cooperating to define the diffractively coupled output aperture, the third resonator mirror being disposed to return all of a predetermined portion of the incident light upon the third mirror to the substantially confocal mirror group and wherein the third resonator mirror is planar permitting adjustment of the amount of light coupled out of the aperture by adjusting the position of the third mirror with respect to the second mirror thereby changing the spacing between the second and third mirrors.

35. The laser of claim 34, wherein the elongated gain medium of length L has a cross-section transverse to the longitudinal resonator axis, the cross-section having a longer and a shorter side, the longer side of width W of the cross-section supporting a hybrid unstable optical resonator mode of operation and the shorter side of height h of the cross-section supporting a guided wave mode of operation.

36. The laser of claim 35, wherein the hybrid unstable resonator has only three mirrors the first and second mirrors comprising the substantially confocal mirror group, the first and second mirrors having a focal length f1 and f2 respectively, whose sum is substantially equal to L and wherein the ratio of f1 to f2 has an absolute value of greater than unity, the ratio and the spacing of distance between the mirror edges of the second and third mirrors cooperate to determine the magnitude of the diffractive output coupling from the resonator.

37. The laser of claim 36, wherein the spacing between the edges of the second and third mirrors cooperate to predetermine the level of variable diffractive output coupling independent of the ratio of the focal lengths of the first and second mirrors.

38. The laser of claim 36, wherein the ratio of the focal lengths of the first and second mirrors cooperate to predetermine the level of diffractive output coupling independent of the spacing between the edges of second and third mirrors.

39. The laser of claim 36, wherein the hybrid unstable resonator is a negative branch resonator.

40. The laser of 39, wherein the elongated laser gain medium comprises a molecular gas excited by an RF discharge.

41. The laser of claim 40, wherein the molecular gas comprises $CO_2$.

42. The laser of claim 41, wherein the third mirror is configured to preferentially favor laser operation on a single branch of $CO_2$ the molecule.

43. The laser claim 41, wherein mirror the third mirror is configured to preferentially favor laser operation on a single line of a single branch of the $CO_2$ molecule.

44. The laser of claim 41, wherein the contour of the edges of the second and third mirrors cooperate to influence the transverse mode content of the diffractive laser output.

45. The laser of claim 44, wherein the contour of the edge of third mirror augments the contour of the edge of the second mirror to influence the transverse mode content of the diffracted laser output.

46. A laser comprising a laser gain medium, the laser gain medium being positioned within a hybrid standing wave unstable optical cavity and a diffractively coupled output aperture, the cavity having an odd number of intracavity mirrors, at least two of the intracavity mirrors being adjacent to one another and having adjacent edges and a lateral distance therebetween, wherein the lateral distance between the adjacent edges of the adjacent mirrors comprises the diffractively coupled output aperture and wherein one of said adjacent resonator mirrors is planar permitting adjustment of the amount of light coupled out of the aperture by adjusting the position of the planar mirror with respect to the other adjacent mirror thereby changing the spacing between adjacent mirrors.

* * * * *